*US011055372B2*

United States Patent
Bastide et al.

(10) Patent No.: US 11,055,372 B2
(45) Date of Patent: Jul. 6, 2021

(54) MANAGING CONTENT ON A SOCIAL NETWORK

(71) Applicant: International Business Machines Corporation, Armonk, NY (US)

(72) Inventors: Paul R. Bastide, Boxford, MA (US); Jonathan Dunne, Dungarvan (IE); Robert E. Loredo, North Miami Beach, FL (US); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 16/006,387

(22) Filed: Jun. 12, 2018

(65) Prior Publication Data

US 2019/0377828 A1 Dec. 12, 2019

(51) Int. Cl.
*G06F 7/00* (2006.01)
*G06F 16/9535* (2019.01)

(52) U.S. Cl.
CPC .............................. *G06F 16/9535* (2019.01)

(58) Field of Classification Search
CPC .............. G06F 16/9535; G06F 16/951; G06F 16/24578; G06F 16/332; G06F 16/334; G06F 16/35; G06Q 50/01; G06Q 50/00; G06Q 30/0242; G06Q 30/0251; G06Q 10/107; G06Q 30/02; H04L 67/325; H04L 67/125; H04L 67/303
See application file for complete search history.

(56) References Cited

U.S. PATENT DOCUMENTS

| 9,189,514 | B1 | 11/2015 | Myslinski | |
|---|---|---|---|---|
| 2004/0139077 | A1 | 7/2004 | Banker | |
| 2014/0344353 | A1* | 11/2014 | Broz | G06F 15/17306 709/204 |
| 2015/0149315 | A1* | 5/2015 | Tischer | G06Q 30/0601 705/26.1 |
| 2016/0050221 | A1 | 2/2016 | Myslinski | |
| 2017/0302613 | A1* | 10/2017 | Imbrie | H04L 51/32 |

FOREIGN PATENT DOCUMENTS

WO   WO-2009089116 A2   7/2009

* cited by examiner

*Primary Examiner* — Azam M Cheema
(74) *Attorney, Agent, or Firm* — Fabian VanCott; Steven L. Nichols

(57) ABSTRACT

Managing content on a social network may include maintaining a database of users of a social network provided over a network interface between a server computing device and the social network. The database records a bias each user has demonstrated with respect to at least one topic. Managing the content may include monitoring reactions to a first post on the social network, determining a first bias factor for the first post based on the reactions to the first post and a corresponding recorded bias from the database of each user that reacts to the first post, and filtering content of a first user's activity stream based on the bias factors of previous posts available for inclusion in the first user's activity stream.

13 Claims, 8 Drawing Sheets

MANAGING CONTENT ON A SOCIAL NETWORK

BACKGROUND

The present invention relates to managing content on a social network, and more specifically, to unbiasing streams of content from the social network.

SUMMARY

According to an embodiment of the present invention, a system for managing content on a social network may include a server computing device, and a network interface between the server computing device and at least one social network. The server computing device includes a maintenance engine to, when executed by a processor, maintain a database of users of the social network. The database records a bias each user has demonstrated with respect to at least one topic. The server computing device includes a monitoring engine to, when executed by the processor, monitor reactions to a first post on the social network. The server computing device includes a monitoring engine to, when executed by the processor, a bias engine to, when executed by the processor, determine a first bias factor for the first post based on the reactions to the first post and a corresponding recorded bias from the database of each user that reacts to the first post. The server computing device also includes a monitoring engine to, when executed by the processor, a filter engine to, when executed by the processor, filter content of a first user's activity stream based on the bias factors of previous posts available for inclusion in the first user's activity stream.

According to another embodiment of the present invention, a method of managing content on a social network may include maintaining a database of users of a social network provided over a network interface between a server computing device and the social network. The database recording a bias each user has demonstrated with respect to at least one topic. The method may also include monitoring reactions to a first post on the social network, and determining a first bias factor for the first post based on the reactions to the first post and a corresponding recorded bias from the database of each user that reacts to the first post. Further, the method may include filtering content of a first user's activity stream based on the bias factors of previous posts available for inclusion in the first user's activity stream.

According to another embodiment of the present invention, a computer program product for managing content on a social network. The computer program product may include a computer readable storage medium comprising computer usable program code embodied therewith. The computer usable program code, when executed by a processor, monitors reactions to a first post on a social network provided over a network interface of a server computing device, and determines a first bias factor for the first post based on the reactions to the first post and a corresponding recorded bias from a database of each user that reacts to the first post, the database recording a bias a plurality of users have demonstrated with respect to at least one topic. The computer usable program code, when executed by a processor, may also filter content of a first user's activity stream based on the bias factors of previous posts available for inclusion in the first user's activity stream.

BRIEF DESCRIPTION OF THE DRAWINGS

The accompanying drawings illustrate various examples of the principles described herein and are part of the specification. The examples do not limit the scope of the claims.

Figure 1:
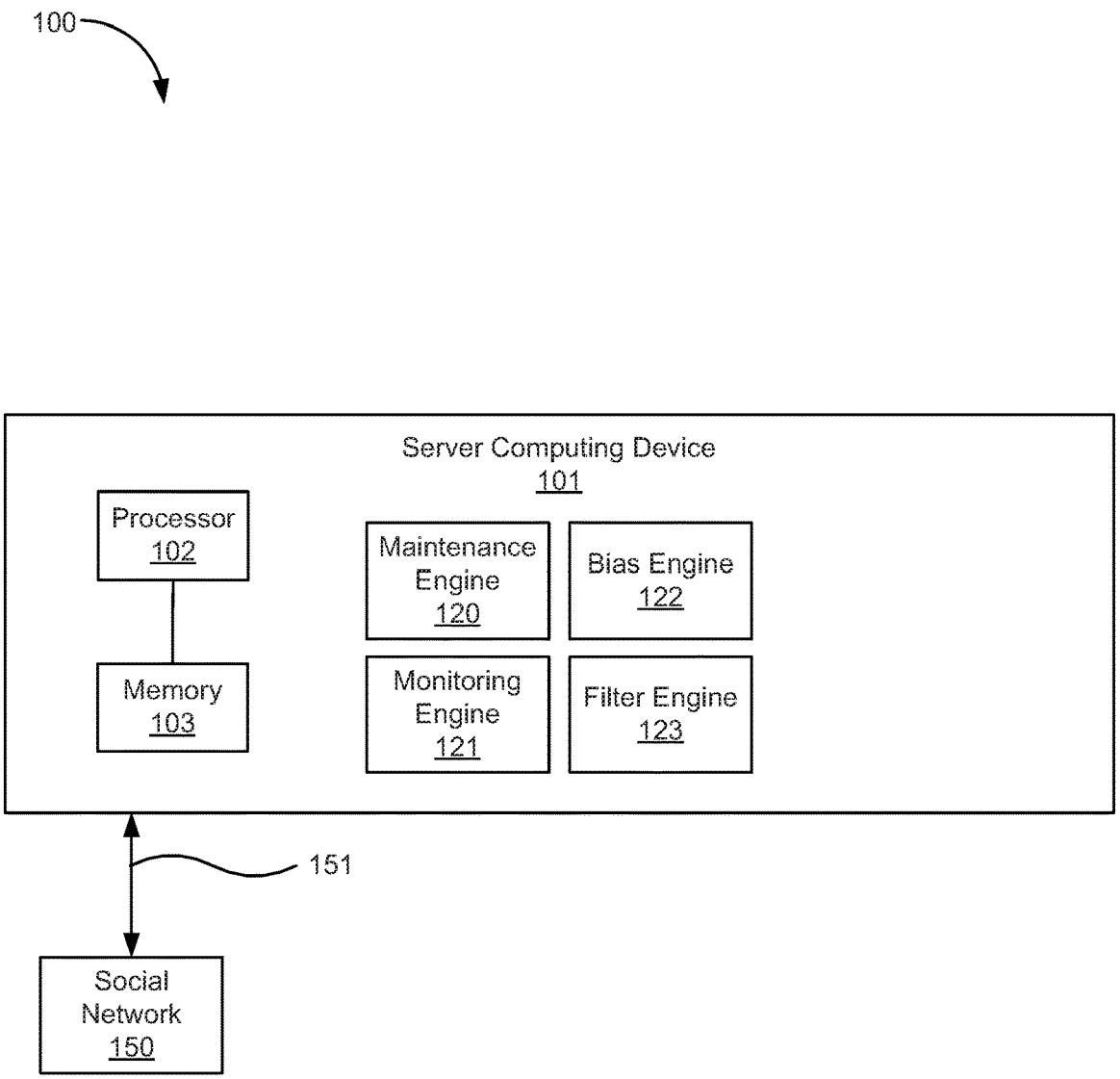
FIG. 1 is a block diagram of a system for managing content on a social network, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The present specification describes methods, systems, and computer program products for managing content on a social network. In some examples, users of social networks may routinely receive biased information via the social network. This biased information or content may be referred to as "fake news." Receipt of biased content may result in significant losses to businesses including revenue losses and a tarnished reputation of the business in instances where individuals receiving content from the social network receive only the one-sided biased information.

Further, a competitor utilizing biased information and content may receive an unfair competitive advantage over the business by using these illegitimate, biased sources. Still further, deceptive practices such as fraudulent schemes and scams may be perpetrated through the dissemination of biased content intended to persuade individuals to purchase products and services from questionable businesses. Still further, online communities may suffer from the negative forms of biased content as legitimate participants of the online communities may become pawns in a marketing war and their blogs, wikis, and other online forums may become polluted with the biased content.

Many individuals, teams, departments, and organizations may desire to have the enhanced ability to understand and adequately process biased content from their networks and content feeds. Oftentimes, because individuals may have a preference for a certain mixture of content that is not often observed by themselves, and individual, after a period of time, may be susceptible to biased content. For example, a first user may predominantly disseminate political updates, but a second user may only continue to "follow" or receive the first user's content and content from similar users and groups. In current push systems of messaging within social networking platforms do not allow the second user to receive balanced content about, in this example, politics that may perhaps originate from the other side of the political spectrum. In this manner, an unperceived bias causes a user to only be exposed to more and more biased content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used in the present specification and in the appended claims, the term "bias" is meant to be understood broadly as any prejudice in favor of or against a thing, person, or group compared with another. The bias may include unintentionally learned behavior developed through a lack of information from both sides of an issue or topic.

As used in the present specification and in the appended claims, the term "social network" is meant to be understood broadly as any relationship over a computerized network in which social actors such as individuals and organizations interact.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described but may not be included in other examples.

As noted above, it may be difficult to ensure that individuals and organizations receive balanced and unbiased information such as news, social networking information, and marketing information, among other types of information. Unbalanced and biased information may negatively harm the perception of an individual or organization through the dissemination of biased information that may be as least misleading and at worst incorrect. Some resources available over a computer network such as the Internet may seek to correct biases. For example, a website titled HOAXY available at http://hoaxy.iuni.iu.edu/ provides a search engine to track biased or incorrect content, and scores content from various social networking platforms. However, these sources fail to provide balanced, unbiased content to a user.

Referring now to the figures, FIG. 1 is a block diagram of a system (100) for managing content on a social network (150), according to an example of the principles described herein. The system (100) may include a server computing device (101) and a network interface (151) to communicatively couple the server computing device (101) to a social network (150). The server computing device (101) may include a processor (102) to execute software stored on a memory (103). More regarding the function of the processor (102) and the memory (103) is provided herein.

The server computing device (101) may include a maintenance engine (120) to, when executed by the processor (102), maintain a database (FIG. 2, 112) of users of the social network (150). The database (FIG. 2, 112) may form part of the memory (103) and is used to record a bias each user has demonstrated with respect to at least one topic. The number of topics that may be discussed within a social network are almost innumerable. However, as described herein, a natural language engine (FIG. 2, 124) may be used to identify the topics within content of the social network (150) such as posts, comments, uploaded content, or other forms of language found on the social network through morphological segmentation, part-of-speech tagging, parsing, sentence boundary disambiguation, stemming, word segmentation, terminology extraction, semantics analysis, other natural language processes and sub-process, and combinations thereof.

Figure 3:
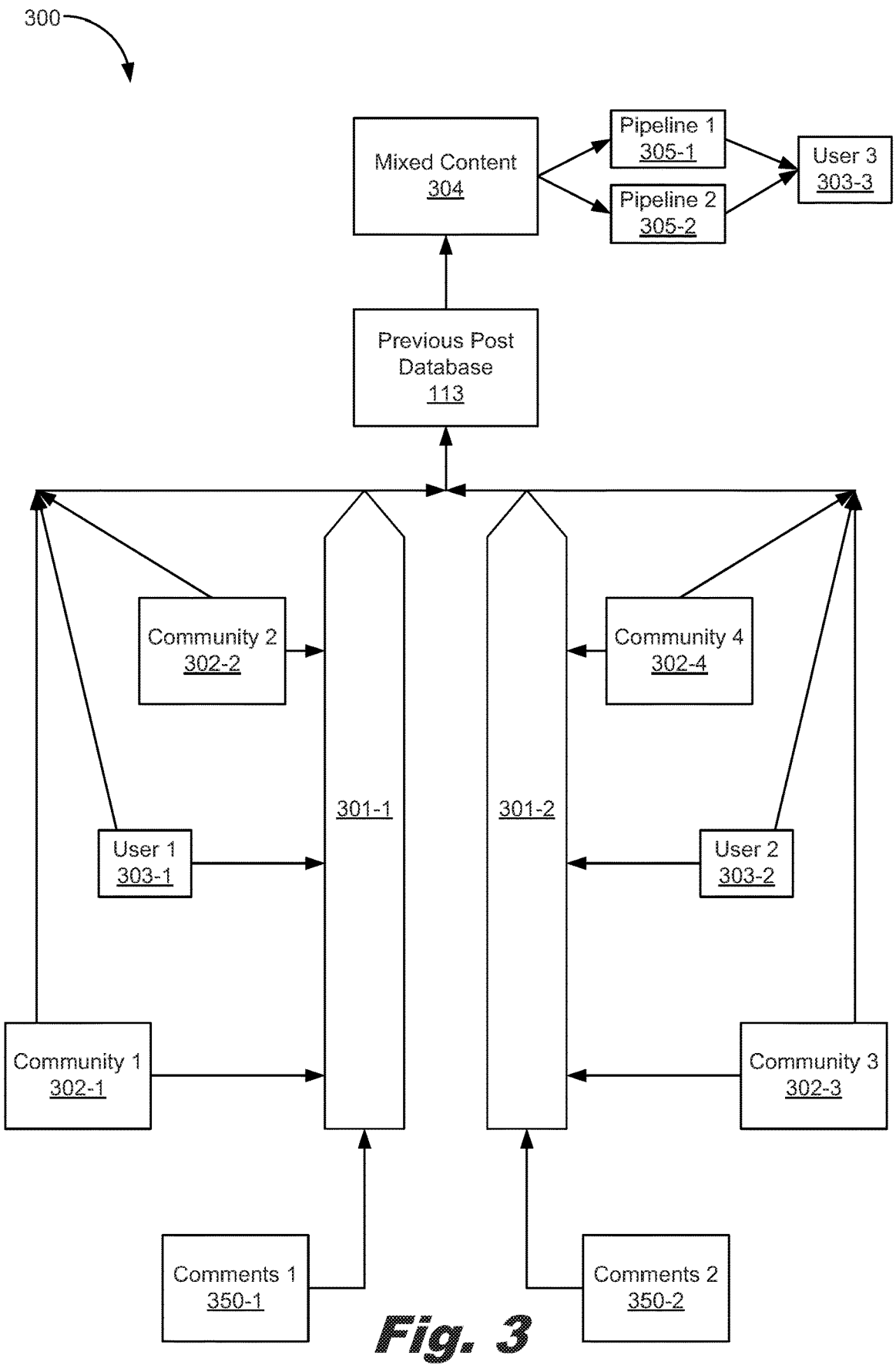
FIG. 3 is a block diagram of a content management scenario, according to another example of the principles described herein.

The server computing device (101) may also include a monitoring engine (121) to, when executed by the processor (102), monitor reactions to a first post on the social network (150). The monitoring engine (121) may monitor any number of posts within the social network (150) simultaneously or consecutively. The monitoring engine (121) may be executable on the server computing device (101), or in another example, may be executed on a user device such as user 3 device (FIG. 3, 303-3). The monitoring of reactions may include, for example, monitoring a first post and any comments by other users or other content associated with the first post.

The bias engine (122) may then determine, when executed by the processor (102), that the first post exhibits a 94% bias towards one side of a spectrum on a first topic. In one example, this monitoring uses the natural language engine (FIG. 2, 124) described herein. In this manner, the bias engine (122) may be included within the server computing device (101) to, when executed by the processor (102), determine a first bias factor for the first post based on the reactions to the first post, a corresponding recorded bias from the database (FIG. 2, 112) of each user that reacts to the first post, or combinations thereof.

Figure 2:
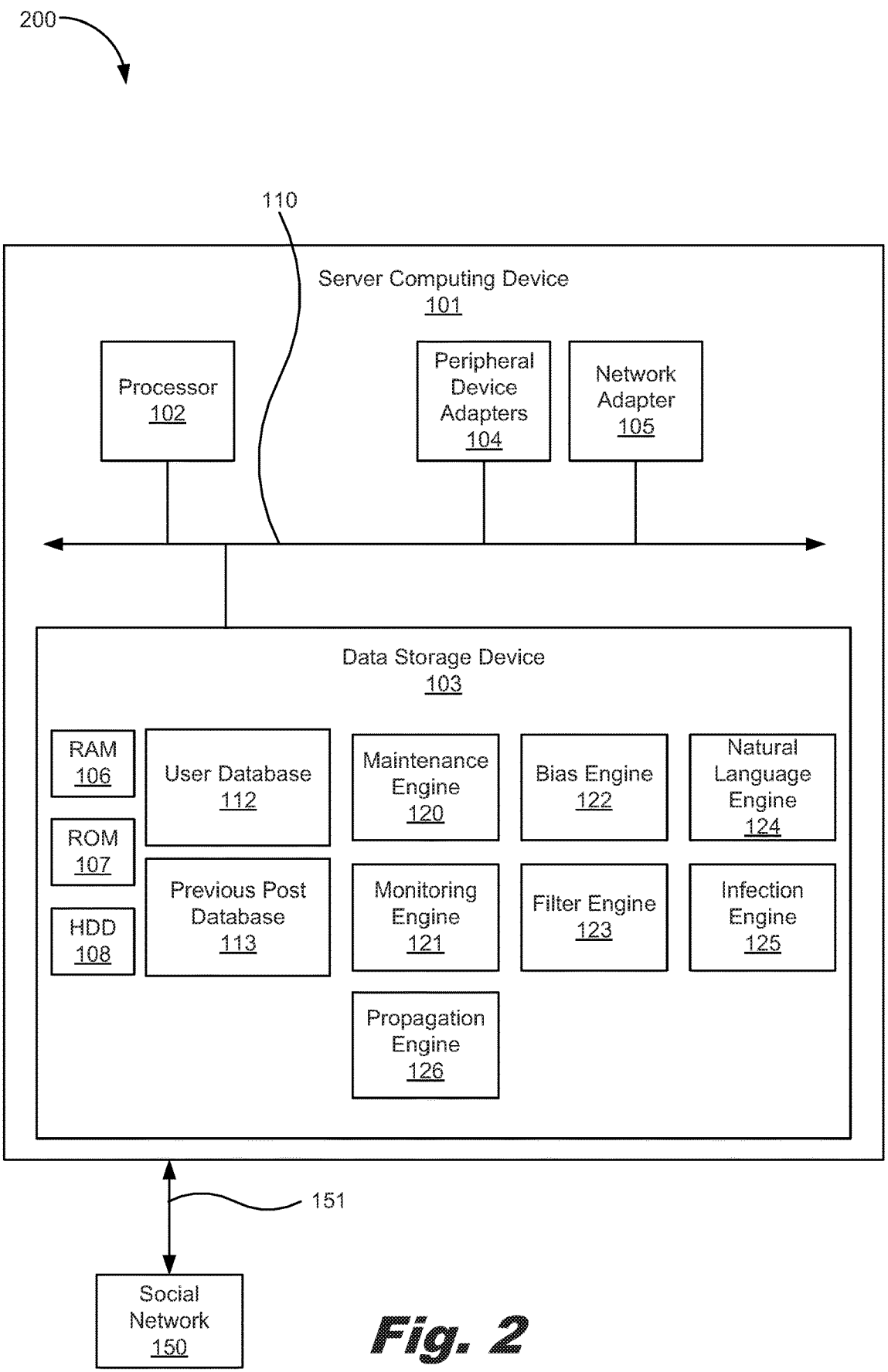
FIG. 2 is a block diagram of a system for managing content on a social network, according to another example of the principles described herein.

In one example, the bias engine (122) may score the bias of the first post and the associated comments based on the determination of the natural language engine (FIG. 2, 124). If the bias engine (122) indicates that the bias score is above a predetermined threshold, at least one of the comments may be added to the database (FIG. 2, 112) or may prompt the user to add the bias score for further processing.

The server computing device (101) may also include a filter engine (123) to, when executed by the processor (102), filter content of a first user's activity stream based on the bias factors of previous posts available for inclusion in the first user's activity stream. An activity stream may include any type of communication stream delivered to the first user such as, for example, a really simple syndication (RSS) feed, a social network feeds, weblogs, podcasts, other web feed types, and combinations thereof.

The first user may initially receive biased or unbalanced content within their activity stream. However, by executing the monitoring engine (121) and the bias engine (122), the activity stream may be monitored and biases associated with posts may be scored. The filter engine (123) may then filter content received by the first user is his or her activity stream. The filtered activity stream will then provide the first user with less biased content and provide more balanced, unbiased content. In this manner, the server computing device (101) and its various engines (120, 121, 122, 123) manage the publishing and receipt of content such that the first user does not receive overly biased content. This allows a manager of the server computing device (101) or the first user to be confident that the proposed balance of the activity stream and the content type postings support the goal of increased objectivity for the first user's benefit.

More regarding the elements of FIG. 1 and other elements will now be described in connection with FIG. 2. FIG. 2 is a block diagram of a system (200) for managing content on a social network (150), according to another example of the principles described herein. The server computing device (101) may be utilized in any data-processing scenario, including stand-alone hardware, mobile applications, a computing network, or combinations thereof. Further, the server computing device (101) may be used in a computing network, a public cloud network, a private cloud network, a hybrid cloud network, other forms of networks, or combinations thereof. In one example, the methods provided by the server computing device (101) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the server computing device (101) are executed by a local administrator.

To achieve its desired functionality, the server computing device (101) includes various hardware components. Among these hardware components may be a number of processors (102), a number of data storage devices (103), a number of peripheral device adapters (104), and a number of network adapters (105). These hardware components may be interconnected through the use of a number of buses and/or network connections. In one example, the processor (102), data storage device (103), peripheral device adapters (104), and a network adapter (105) may be communicatively coupled via a bus (110).

The data storage device (103) stores data, such as executable program code, that is executed by the processor (102) or other processing device. As will be discussed, the data storage device (103) may specifically store computer code representing a number of applications that the processor (102) executes to implement at least the functionality described herein.

The data storage device (103) may include various types of memory modules, including volatile and nonvolatile memory. For example, the data storage device (103) of the present example includes Random Access Memory (RAM) (106), Read Only Memory (ROM) (107), and Hard Disk Drive (HDD) memory (108). Many other types of memory may also be utilized, and the present specification contemplates the use of as many varying type(s) of memory in the data storage device (103) as may suit a particular application of the principles described herein. In certain examples, different types of memory in the data storage device (103) may be used for different data storage needs. For example, in certain examples, the processor (102) may boot from Read Only Memory (ROM) (107), maintain nonvolatile storage in the Hard Disk Drive (HDD) memory (108), and execute program code stored in Random Access Memory (RAM) (106).

The data storage device (103) comprises a computer readable medium, a computer readable storage medium, or a non-transitory computer readable medium, among others. For example, the data storage device (103) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (104, 105) in the server computing device (101) enable the processor (102) to interface with various other hardware elements, external and internal to the server computing device (101). For example, the peripheral device adapters (104) may provide an interface to input/output devices, such as, for example, a display device, a mouse, or a keyboard. The peripheral device adapters (104) may also provide access to other external devices, such as an external storage device, a number of network devices such as, for example, servers, switches, and routers, client devices, other types of computing devices, and combinations thereof.

The server computing device (101) includes a number of engines used in the implementation of generating a skills database for a user. The various engines within the server computing device (101) include executable program code that may be executed separately. In this example, the various engines may be stored as separate computer program products. In another example, the various engines within the server computing device (101) may be combined within a number of computer program products; each computer program product includes a number of the engines.

For example, the maintenance engine (120) maintains a database (112) of users of the social network (150). The user database (112) is used to record a bias each user has demonstrated with respect to at least one topic. The users are any individuals participating in the creation of the content within the social network (150) with their associated computing devices communicatively coupled to the social network (150). The maintenance engine (120) may also maintain a database (113) of previous posts. The previous posts within the previous post database (113) may be obtained from a number of past posts and other content such as comments related to those posts and may include any user's past content and bias scores provided by the bias engine (122).

The monitoring engine (121) monitors reactions to a first post on the social network (150). For example, a first user may post content within an activity stream (FIG. 3, 301-1, 301-2) that will be seen by a second user. The second user may react in one of the following ways: (1) "likes" the content; (2) comments favorably on the content; (3) "dislikes" the content; or (4) comments negatively on the content. These reactions may be made as to any type of initial comment or post whether that initial comment is a positive or negative comment as to a particular topic.

The bias engine (122) determines a first bias factor or score for the first post based on at least the reactions to the first post. For example, the content of the first post may be provided to an end user if the specific biased users or entities have read or seen the initial post while the system is cognizant of which side of the spectrum the biased content is aligned. For example, a first user may be pro-conservative as determined by previous posts and comments and is likely to "like" content that is pro-conservative. Likewise, a second user may not be conservative and, therefore, may be more likely to "like" content that is non-conservative. Therefore, using many users' behavior, or lack of specific behavior, in reading the same semantic content and determining how the users react or do not react to the content, the system (200)

may have increased confidence of the bias of content coming down a plurality of activity streams. In one example, the end consumer or user of the activity streams may request that the system (200) provide him or her with a 50% biased content on the topics addressed in the content and merge the content with the two separate biases into the one set of content such as a web stream. Thus, the system (200) orchestrates the publishing of content on a social networking site by content type in a balanced manner that adheres to the content type ratio preferences of the reader or end consumer.

In one example, the bias engine (122) may also determine a first bias factor or score for the first post based on a corresponding recorded bias from the user database (112) and/or the previous post database (113) and entries recorded therein as to each of the users that react to the first post. This may be in place of or in addition to being based on at least the reactions to the first post described above.

The filter engine (123) stored in the data storage device (103) filters content of the first user's activity stream based on the bias factors of previous posts stored in the previous post database (113) available for inclusion in the first user's activity stream. The filtering may be based on instructions received from the end consumer or user of the activity streams who may request that the system (200) provide him or her with balanced, unbiased content on the topics addressed in the content, or some level of biased content. In this manner, the user may set the level of bias the filter engine (123) is to apply in providing him or her with the content.

The natural language engine (124) is used in conjunction with the other engines (120, 121, 122, 123) in identify the topics within content of the social network (150) such as posts, comments, uploaded content, or other forms of language found on the social network. The natural language engine (124) employs a number of processes such as, for example, morphological segmentation, part-of-speech tagging, parsing, sentence boundary disambiguation, stemming, word segmentation, terminology extraction, semantics analysis, other natural language processes and subprocess, and combinations thereof in determining the position the content takes with regard to the topic discussed therein. This position may then be used by, the other engines (120, 121, 122, 123) to maintain, monitor, score, and filter content to identify what biases may exist in the content provided over the social network (150).

The system (200) may also include an infection engine (125). The infection engine may determine a likelihood that a cohort of news content providers will be "infected" by news bias. For example, once a bias has been perpetuated through a number of activity streams, it may prove difficult to reverse the spread of the biased news or other biased content, and the biased content may infect groups of organizations and individuals. The system (200), executing the infection engine (125) may identify the manner in which the biased content has or will spread through the social network (150), and may take action such as influencing scores assigned by the bias engine (122) in order to curb the propagation of biased content. In one example, the infection engine (125), when executed by the processor (102), may determine the manner in which previous biased content has spread through the social network and the response each user may have had including whether the user presented that bias content, approved of the bias content, or disseminated the biased content to other users within an activity stream (FIG. 3, 301-1, 301-2). The natural language engine (124) may be executed to identify the topics within the biased content, and include that information in the analysis of the infection engine (125) where the infection engine (125) uses the topics identified as a basis to assume that the content is biased. In response to a determination by the infection engine (125) that biased content is likely to be spread through an activity stream (FIG. 3, 301-1, 301-2), the processor (102) may execute the bias engine (122) and the filter engine (123) to filter the content within the activity stream based on the severity of the findings of the infection engine (125).

Associated with the infection engine (125), the propagation engine (126) of the system (200) may determine the potency of infectious content bias across a wider propagation sphere. This potency may be based on the number of individuals or organizations that are provided the infectious content, how likely the individuals or organizations are to further disseminate the infectious content, the bias score of the content provided by the bias engine (122), other criteria, and combinations thereof. In one example, the propagation engine (126) may be executed along with the natural language engine (124) to determine the topics within the bias content and the severity of the words used in connection with the biased content to determine how potent the biased content may be to other users. In response to a determination by the propagation engine (126) that the biased content exceeds a potency above a threshold, the processor (102) may execute the bias engine (122) and the filter engine (123) to filter the content within the activity stream based on the severity of the findings of the infection engine (125).

Having described the elements of the system (200) in FIGS. 1 and 2, a scenario will now be described in connection with FIG. 3. FIG. 3 is a block diagram of a content management scenario (300), according to another example of the principles described herein. The content management scenario (300) may include a number of comments (350-1, 350-2, collectively referred to herein as 350) being added to two separate activity streams (301-1, 301-2, collectively referred to herein as 301). Although only two activity streams (301) are depicted in FIG. 3, the content management scenario (300) may include any number of activity streams (301). The comments (350) may be any content that is added to the activity streams (301) such as, for example, initial content in the form of posts, comments video, audio, and other forms of content, as well as content that is provided based on associated with the initial content. As described herein, the comments (350) may be biased in one way or another, and it may be desirable to provide a balanced and unbiased group of comments (350).

A number of communities (302-1, 302-2, 302-3, 302-4, collectively referred to herein as 302) and users (303-1, 303-2, 303-3, collectively referred to herein as 303) may be able to communicate with the activity streams (301) via associated computing devices operated by the communities (302) and users (303). User 3 (303-3) may be distinguished from the other two users (303-1, 303-2) by the fact that user 3 (303-3) is the end user that receives the balanced, unbiased content as provided by the system (100, 200). The other two users (303-1, 303-2) and the communicates (302) are able to react to the comments (350) provided to the activity streams (301) in the form of comments or other content that is associated with the comments (350). As described herein, the content that is associated with the comments (350) and provided by the other two users (303-1, 303-2) and the communicates (302) may be biased in one way or another, and it may be desirable to provide a balanced and unbiased group of comments from the two users (303-1, 303-2) and the communicates (302) to user 3 (303-3).

In the scenario (300) of FIG. 3, content may be provided to user 3 (303-3) as the end user if specific biased users (303-1, 303-2) and the communicates (302) have read or seen the content while the system is cognizant of which side of the spectrum the biased content is aligned. For example, user 1 (303-1) may be pro-conservative and is likely to "like" content that is pro-conservative. Similarly, user 2 (303-2) may not be conservative and is more likely to "like" content that is non-conservative. The system (100, 200) orchestrates publishing of content by content type in a balanced manner that adheres to the content type ratio preferences of user 3 (303-3).

For example, the user 1 (303-1) may post the following comment (350): "XYZ Corporation is likely to have a financial loss this year because X." The system (100, 200) may determine that user 2 (303-2) has viewed the above post and has determined that user 2 (303-2) for that specific content type is biased to agree with the sentiment "XYZ Corporation is likely to have a financial loss this year because X." and exhibits one or more of the following behaviors: (1) user 2 (303-2) "likes" the content, and/or (2) user 2 (303-2) comments favorably with regard to the content. The system (100, 200) has determined that community 3 (303-3) also has viewed the above post and has determined that community 3 (303-3) is biased to agree with that sentiment and exhibits one or more of the following behaviors: (1) community 3 (303-3) "dis-likes" the content; and/or (2) community 3 (303-3) comments negatively on the content.

Community 4 (303-4) may then post the following comment (350): "XYZ Company is will likely make a big recovery this year because Y." The system (100, 200) may determine that user 2 (303-2) has viewed the above post and user 2 (303-2) for that specific content type is biased to disagree with that sentiment and exhibits one or more of the following behaviors: (1) user 2 (303-2) ignores the content; and/or (2) user 2 (303-2) comments negatively on the content. Further, the system (100, 200) may determine that community 2 (302-2) has viewed the above post and community 2 (302-2) is biased to agree with that sentiment and exhibits one or more of the following behaviors: (1) community 2 (302-2) "likes" the content; and/or (2) community 2 (302-2) comments positively on the comment (350).

Thus, the system (100, 200) may now ascertain the users (303) and groups (302) that are biased for or against specific stances on topics. Based on this determination, the system (100, 200) may impose a hold on the post of the comment (350) if bias threshold criteria are met as they are in this scenario. In one example, the system (100, 200) may notify the user 3 (303-3), the publisher of the comment (350), or combinations thereof of the above likely impact. Further, in one example, the system (100, 200) may provide a response, such as: "By looking at previous behaviors of users to this content, a likely biased scenario is evident. For that reason, this message is currently being processed for bias." In this manner, the users of the system (100, 200) may be made aware of bias within the activity streams (301).

In one example, the bias engine (122) and/or the filter engine (123) of the system (100, 200) may also cause a user interface to post comments or other posts from the previous post database (113) that may be suitable in counter balancing the bias of the first post. The bias engine (122) and/or the filter engine (123) may also suggest timelines for the counter balancing comment insertion, and may recommend, for example, merging the biased content immediately or delaying the merge by a period of time. The bias engine (122) and/or the filter engine (123) may also suggest where the counter balancing comment may be inserted within the activity streams (301) or the eventual stream of content that reaches the end user, user 3 (303-3).

When the system (100, 200) is enabled, the system (100, 200) may also be configured to scan, using the monitoring engine (121), looking for the biases among the activity streams (301) at pre-defined intervals of time. Further, the system (100, 200) may also retrospectively ascertain that content within the activity stream (301) was not appropriate due to its biased position and may remove the biased content from the activity stream (301) or a database of the user (303). In one example, the filter engine (123) may be executed to remove the biased content from the activity stream (301) or a database of the user (303) of the social network (150).

In one example, a user of the social network may request that the system (100, 200) manages the topics, comments, and postings the user of the social network. As described herein, the natural language engine (124) of the system (100, 200) analyzes the content type of an original post. The server computing device (101) of the system (100, 200) or a client-side component located at the computing devices of the users (303) monitors the bias of the content posted within the activity streams (301). In one example, it may be determined through execution of the engines (120, 121, 122, 123, 124, 125, 126) that a first post exhibits a 94% bias towards one side of a spectrum associated with a first topic. The monitoring uses the natural language processing provided by the natural language engine (124) and the bias scoring of the bias engine (122) to drive the system (100, 200). If a bias in the first post is determined to exist, then, depending on the configuration, the comment may be automatically added or the user is prompted to add this for further processing. A record of the management of the first post is then created within the user database (112) and/or the previous post database (113). An example of this management record may include the following:

Content type (70% threshold certainty): Programming Language 4 common business-oriented language (COBOL)
 Show_For: user 2 (303-2)
 Hide_For user 1 (303-1), community 4 (302-4)

In this manner, the comment that is determined to include a bias may be provided or shown to user 2 (303-2), but not provided to or hidden from user 1 (303-1) and community 4 (302-4) based on these entities preferences or in order to balance any bias that may exist in their respective activity streams (301).

A separate record created and stored in the user database (112) and/or the previous post database (113) may be used to track spectrum bias and associated content type, and may look as follows:

Content Type Name: Programming Language→COBOL
 Bias1: slow
 Bias2: out of date
 Bias3: interesting
 Bias4: easy to learn
 Bias1 user: user342
 Bias1 user: user749
 Bias3 user: user3214
 Bias3 user: user574
 Bias4 user: user844
 Threshold_Absolute_count: 14
 Threshold_ratio_with_Content-type: 4-1

The biases "Bias1, "Bias2, "Bias3," and "Bias4" listed above indicate the type of biases that may exist, and identifies users who may have the listed biases and include "user342,"

"user749," "user3214," user574," and "user844." The absolute threshold (Threshold_Absolute_count) noted above indicates the minimum number of documents as related to that particular bias that may be obtained before the system (100, 200) deems a user as having a bias. The ratio threshold (Threshold_ratio_with_Content-type) noted above indicates the minimum ratio of document of a bias as compared to other visible biases that may be identified before the system deems a user as having a bias.

The bias engine (122) takes records like the above and processes them to ascertain the applicability of the post to the users whose activity streams (301) are being monitored. For example, the following record may be created and stored in the user database (112) and/or the previous post database (113) for any consumer of the content:
Studied user: User 3 (303-3)
Existing_bias: Bias3
Recommendation: Source Bias1 & Bias2 for merge The system uses a scoring system executed by the bias engine (122) to estimate if a user is likely to have a pre-existing bias. The bias engine (122) uses several variables and methods for a user such as, for example, a forum moderator that may use the system (100, 200) to combat bias, to ascertain whether a user is likely to have a pre-existing bias. In one example, the system (100, 200) monitors the users over time to obtain a larger number of samples and, consequently, a better analysis of the biases within the social network (150). In one example, users who exhibit biased activity may have their bias probability score that defines whether bias or fake news is being posted, increased for those users. In this situation, the bias engine (122) may have the user database (112) and/or the previous post database (113) store a record that may look as follows:
user342→typically comment on Bias3 (98% likelihood)
user749→typically ignores Bias2 (45% likelihood)
user3214→typically likes Bias1 (16% likelihood)
user574→typically ignores Bias4 (55% likelihood)
user844→typically ignores Bias35 (87% likelihood)
Thus, when a first post and a second post a published, an understanding of the bias may be understood by looking at the behaviors towards the different posts by different users as follows:
postX→viewed by user342→typically comment on Bias3
postX→viewed by user749→typically ignores Bias2 (Validated)
postX→viewed by user3214→typically likes Bias1
postX→viewed by user574→typically ignores Bias4
postX→viewed by user844→typically ignores Bias35
postY→viewed by user342→typically comment on Bias3
postY→viewed by user749→typically ignores Bias2
postY→viewed by user3214→typically likes Bias1
postY→viewed by user574→typically ignores Bias4 (Validated)
postY→viewed by user844→typically ignores Bias35

In one example, and administrator of the system (100, 200) may serve as a moderator of online content within the social network (150). The administrator may use the functionality of understanding the biases of users by looking at the behaviors towards the different posts by different users in order to monitor the distribution of biased content or fake news being engaged in. The administrator may be able to specify varying degrees of threshold and weightings for each of the variables described herein and above. In one example, the system (100, 200) may generate a user interface may be provided that allows the variables to be tuned using, for example, a graphic equalizer interface. In this example of the user interface, the amount of information that is analyzed may also include a volume control. The volume control allows the administrator to provide more or less of other posts on the social network that are analyzed based on the toggling of the volume control.

In one example, when executing the engines (120, 121, 122, 123, 124, 125, 126) of the server computing device (101), a bias score may be assigned for users that match a certain content type. Further, the moderator may assign a score or weighting for users who have posted a diverse range of topics on the social network (150). This information may be achieved autonomically by the system (100, 200) or explicitly defined to users or groups of users based on differential criteria. This may also be done based on personal profiles of the users, and, in one example, the probability that a user is a biased user may be increased if the user has used copied the content from other biased users in part or in whole.

Further, the administrator of the system (100, 200), may provide feedback or other information to the system (100, 200). For example, the administrator may instruct the system (100, 200) to not track certain characteristics of users or groups of users. Further, the administrator may instruct the system (100, 200) to provide more information to the system (100, 200) such as, for example, tracking and comparing attachments and links used by different users for bias affinity in content and time. Still further, the administrator may instruct the system (100, 200) to further reconfigure for pattern analysis over time.

Turning again to FIG. 3, the output of the activity streams (301), the posts and comments provided by the first and second users (303-1, 303-2) and the communities (302) are aggregated into the previous post database (113) which serves as a source for which the monitoring engine (121), the bias engine (122), and the filter engine (123) may use as a source for providing the end user, user 3 (303-3), with a more balanced, unbiased stream of content. The monitoring engine (121), the bias engine (122), and the filter engine (123) may obtain a variety of different content from the previous post database (113) to create mixed content (304) that is fed to user 3 (303-3) through at least one pipeline (305-1, 305-2, collectively referred to herein as 305). In one example, two pipelines (305), a first pipeline (305-1) and a second pipeline (305-2), may be presented to user 3 (303-3) to mimic the two activity streams (301) that user 3 (303-3) may be expecting to see. However, the content provided by the pipelines (305) contain a balanced and unbiased set of posts and comments that user 3 (303-3) has requested and/or the system (100, 200) has provided through the systems and methods described herein.

Figure 4:
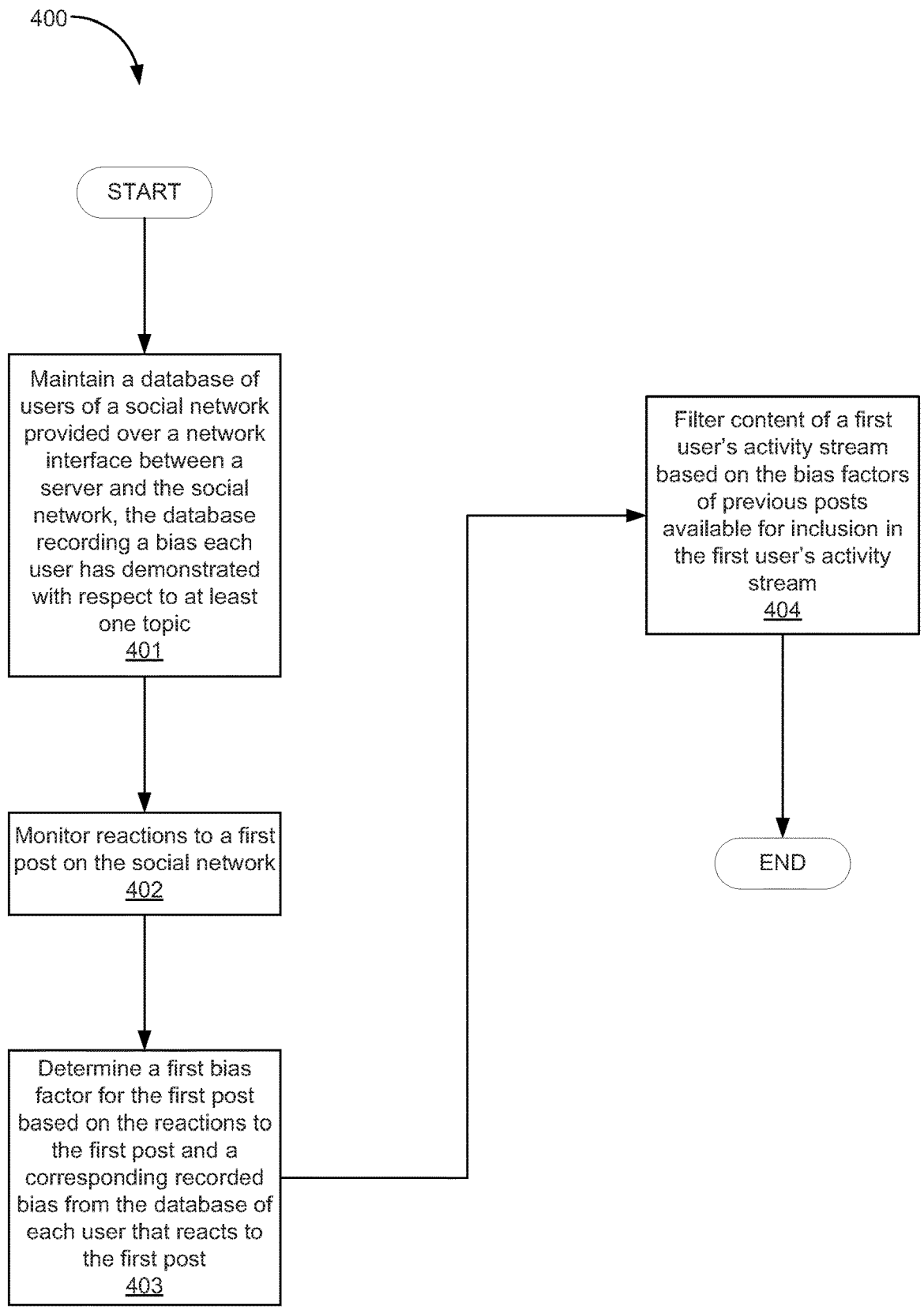
FIG. 4 is a flowchart showing a method of managing content on a social network, according to an example of the principles described herein.

FIG. 4 is a flowchart showing a method (400) of managing content on a social network (150), according to an example of the principles described herein. The method (400) may include maintaining (block 401) a database of users (112) of a social network (150) provided over a network interface (151) between a server computing device (101) and the social network (150) by executing the maintenance engine (120) with the processor (102). The user database (112) records a bias each user has demonstrated with respect to at least one topic.

The method (400) may also include executing the monitoring engine (121) with the processor (102) to monitor (block 402) reactions to a first post on the social network (150). The monitored reactions to the post may include approval of the post, commenting positively on the post, commenting negatively on the post, ignoring the post, or combinations thereof. Monitoring (block 402) the reactions may include scanning the posts and comments to the post for biases after an interval of time.

The method (400) of FIG. 4 may also include determining (block 403) a first bias factor for a first post based on the reactions to the first post and a corresponding recorded bias from the user database (112) of each user that reacts to the first post. Block 403 may be accomplished by executing, with the processor (102), the bias engine (122). The bias factor (also referred to herein as a bias score) may be presented to a user or administrator, and a threshold may be set with regard to the bias score. The threshold may be set, and the posts or comments to the posts presented in the social network (150) may be classified as being biased in response to a determination that the bias scores associated with the posts or comments to the posts are above the threshold so as to be classified as biased. In one example, the threshold may be adjusted by an administrator or other user in order to tune the bias of the posts that a user is able to view and present a different level of bias so that the content the user is provided with is more balanced and unbiased.

The method (400) of FIG. 4 may also include filtering (block 404) content of a first user's activity stream (301, 305-1, 305-2) based on the bias factors of previous posts available for inclusion in the first user's activity stream. In this manner, user 3 (303-3) is provided filtered content that reflects a more balanced and unbiased set of posts and comments via the pipelines (305).

In one example, the method (400) may include reporting to a system administrator an indication of the first posts having a first bias factor exceeding a threshold. As described herein, the threshold may be adjustable in order to tune the bias to a desired or appropriate level. Further, the bias each of the users has demonstrated with respect to the at least one topic may be assigned a bias score, the bias score being adjusted based on whether the users' content has been from other biased users. The method (400) of FIG. 4 may also include receiving input from the first user indicating a bias balance in filtering the content of the first users' activity stream. Further, the monitored reaction to the post may include approval of the post, commenting positively on the post, commenting negatively on the post, ignoring the post, and combinations thereof. Further, as described herein, the method (400) may include, with a natural language processor, determining the topic of the first post, and matching the first post to the topic recorded in the user database (112).

Figure 5:
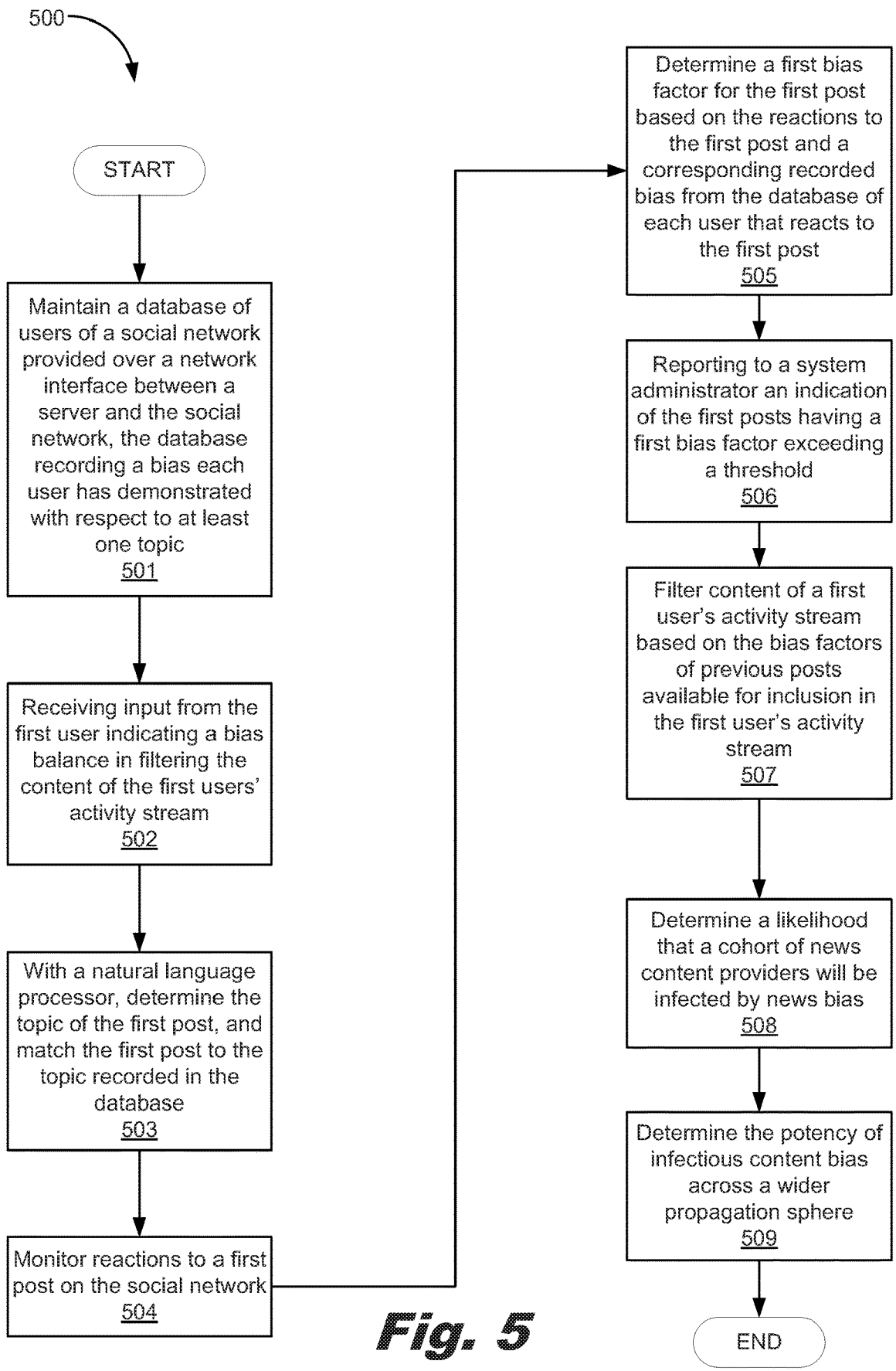
FIG. 5 is a flowchart showing a method of managing content on a social network, according to another example of the principles described herein.

FIG. 5 is a flowchart showing a method (500) of managing content on a social network, according to another example of the principles described herein. Block 501 may proceed as described above in connection with block 401 of FIG. 4. The method (500) of FIG. 5 may also include receiving (block 502) input from the first user indicating a bias balance in filtering the content of the first users' activity stream. A user such as, for example, user 3 (303-3) may request the system (100, 200) to debias and balance the content user 3 (303-3) receives. In another example, the system (100, 200) may identify that user 3 (303-3) is receiving biased content and may either inform user 3 (303-3) that a debiasing or balancing of his or her stream is taking place or may simply debiasing or balancing of his or her stream without informing user 3 (303-3).

The method (500) may further include, with a natural language processor such as the natural language engine (124), determine the topic of a first post, and match the first post to the topic recorded in the user database (112). Again, the natural language engine (124) may be used to identify the topics within content of the social network (150) such as posts, comments, uploaded content, or other forms of language found on the social network through morphological segmentation, part-of-speech tagging, parsing, sentence boundary disambiguation, stemming, word segmentation, terminology extraction, semantics analysis, other natural language processes and sub-process, and combinations thereof.

Block 504 may proceed as described above in connection with block 402 of FIG. 4 described herein. Further, block 505 of FIG. 5 may proceed as described above in connection with block 403 of FIG. 4 described herein. The method (500) of FIG. 5 may further include reporting (506) to a system administrator an indication of the first posts having a first bias factor exceeding a threshold. An administrator may instruct the system (100, 200) to balance and debias the content that user 3 (303-3) receives. Thus, the report to the administrator may help user 3 (303-3) in obtaining the balanced and unbiased content. Block 507 may proceed as described above in connection with block 404 of FIG. 4 described herein.

At block 508, the infection engine (125) of the system (100, 200) may be executed by the processor (102) to determine (block 508) a likelihood that a cohort of news content providers will be "infected" by news bias, and the propagation engine (126) of the system (100, 200) may, when executed by the processor (102), determine (block 509) the potency of infectious content bias across a wider propagation sphere. With the information provided by the infection engine (125) and the propagation engine (126), the system (100, 200) or an administrator may adjust the thresholds associated with the bias scores of the content within the social network (150) in order to provide even more balanced and unbiased content to user 3 (303-3) based on those findings. With the methods of FIGS. 4 and 5, the system (100, 200) may obtain the objective of providing users with unbiased and balanced content. The provision of such unbiased and balanced content may lead to an increase in understanding of both sides of an issue or topic and may lead to rational and effective discussion within the social network (150) that may, in turn, lead to solutions to problems associated with those issues or topics being resolved.

Figure 6:
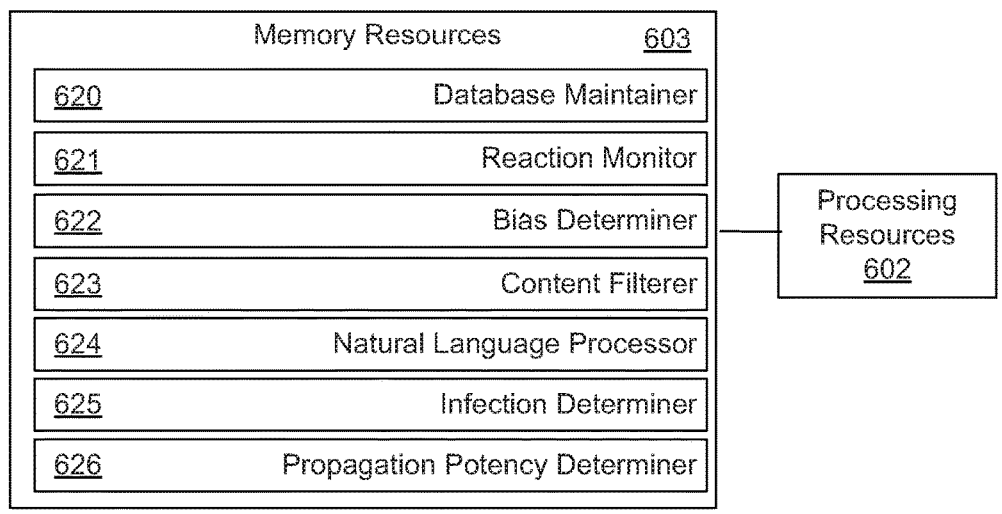
FIG. 6 is a block diagram of an example of a social network content manager, according to one example of principles described herein.

FIG. 6 is a block diagram of an example of a social network content manager (600), according to one example of principles described herein. The social network content manager (600) may include processing resources (602) that are in communication with memory resources (603). Processing resources (602) include at least one processor and other resources used to process programmed instructions. The memory resources (603) represent any memory capable of storing data, such as programmed instructions or data structures used by the social network content manager (600). The programmed instructions shown stored in the memory resources (603) include a database maintainer (620), a reaction monitor (621), a bias determiner (622), a content filterer (623), a natural language processor (624), an infection determiner (625), and a propagation potency determiner (626).

The memory resources (603) include a computer readable storage medium that contains computer readable program code to cause tasks to be executed by the processing resources (602). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The database maintainer (620) represents programmed instructions that, when executed, cause the processing resource (602) to maintain a database (FIG. 2, 112) of users of the social network (150). The reaction monitor (621) represents programmed instructions that, when executed, cause the processing resource (602) to monitor reactions to at least one post on the social network (150). The bias determiner (622) represents programmed instructions that, when executed, cause the processing resource (602) to determine at least one bias factor for the at least one post based on the reactions to the at least one post, a corresponding recorded bias from the database (FIG. 2, 112) of each user that reacts to the at least one post, or combinations thereof. The content filterer (623) represents programmed instructions that, when executed, cause the processing resource (602) to filter content of at least one user's activity stream based on the bias factors of previous posts available for inclusion in the at least one user's activity stream.

The natural language processor (624) represents programmed instructions that, when executed, to identify the topics within content of the social network (150) such as posts, comments, uploaded content, or other forms of language found on the social network through morphological segmentation, part-of-speech tagging, parsing, sentence boundary disambiguation, stemming, word segmentation, terminology extraction, semantics analysis, other natural language processes and sub-process, and combinations thereof. The infection determiner (625) represents programmed instructions that, when executed, determine a likelihood that a cohort of news content providers will be infected by news bias. The propagation potency determiner (626) represents programmed instructions that, when executed, determines the potency of infectious content bias across a wider propagation sphere.

The server computing device (101) within the examples described herein may be utilized in any data-processing scenario, including stand-alone hardware, mobile applications, a computing network, or combinations thereof. Further, the server computing device (101) may be used in a computing network, a public cloud network, a private cloud network, a hybrid cloud network, other forms of networks, or combinations thereof. In one example, the methods provided by the server computing device (101) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the server computing device (101) are executed by a local administrator.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
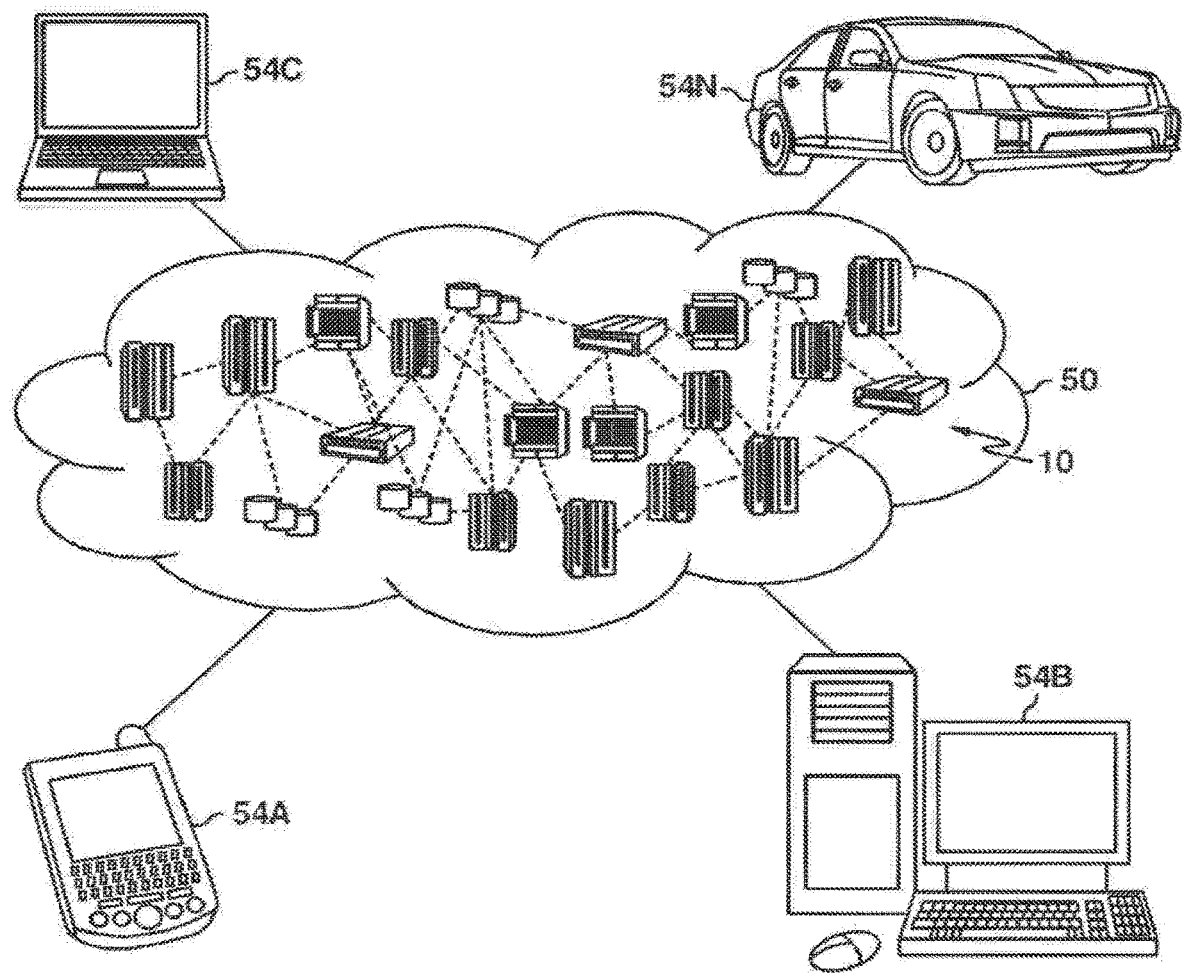
FIG. 7 is a cloud computing environment, according to one example of principles described herein.
Figure 8:
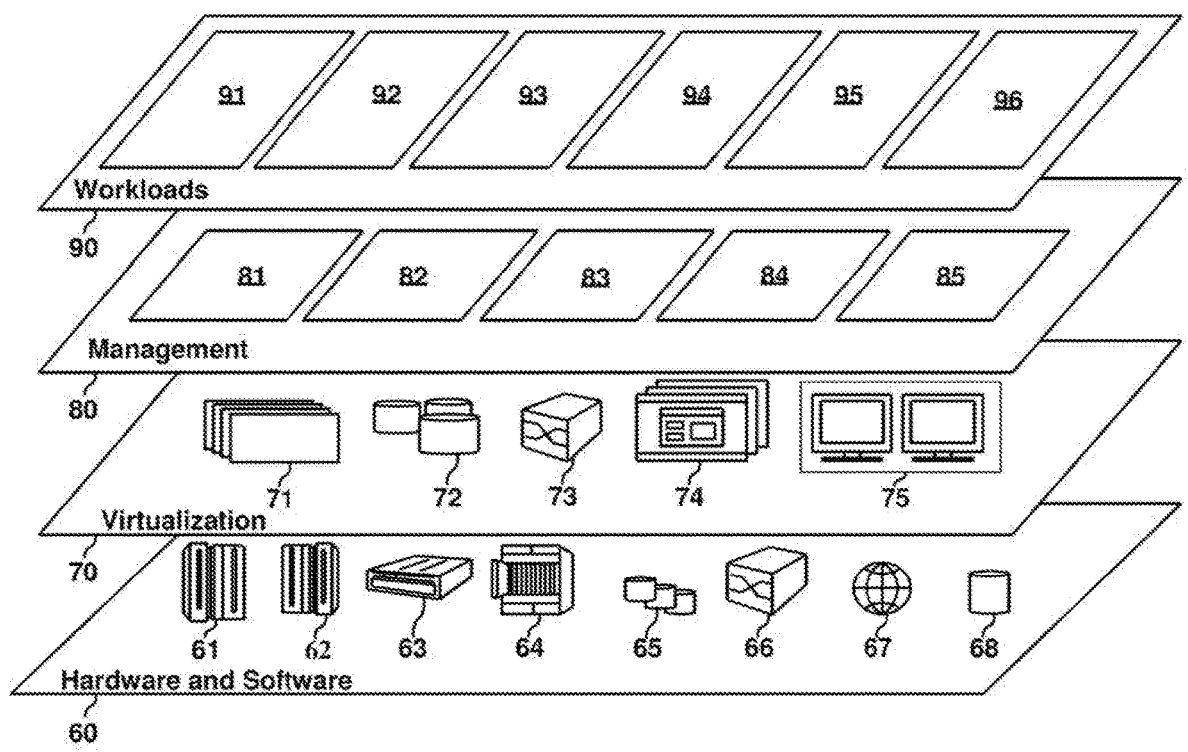
FIG. 8 depicts abstraction model layers according to an embodiment of the present invention.

Referring now to FIG. 7, illustrative cloud computing environment (50) is depicted. As shown, cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 7 are intended to be illustrative only and that computing nodes (10) and cloud computing environment (50) can communicate with any type of computerized device over any type of network and/or network addressable connection (e.g., using a web browser).

Referring now to FIG. 2, a set of functional abstraction layers provided by cloud computing environment (FIG. 7, 50) is shown. It should be understood in advance that the components, layers, and functions shown in FIG. 2 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment (85) provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and social network content managing (96).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (102) of the server computing device (101) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for managing content on a social network, the system comprising:
   a server computing device;
   a network interface between the server computing device and at least one social network;

the server computing device comprising:
- a maintenance engine to, when executed by a processor, maintain a database of users of the social network, the database recording a bias each user has demonstrated with respect to at least one topic;
- a monitoring engine to, when executed by the processor, monitor reactions to a first post on the social network, wherein the monitored reactions to the first post comprise approval of the first post, commenting positively on the first post, commenting negatively on the first post, or ignoring the first post;
- a bias engine to, when executed by the processor, determine a first bias factor for the first post based on the reactions to the first post and a corresponding recorded bias from the database of each user that reacts to the first post;
- a filter engine to, when executed by the processor, filter content of a first user's activity stream based on bias factors of previous posts available for inclusion in the first user's activity stream, wherein the server computing device reports to a system administrator an indication of the first post having the first bias factor exceeding a threshold; and
- a second database comprising at least one previous post, wherein the server computing device identifies a pervious post in the second database with a second bias factor to balance the first bias factor of the first post.

2. The system of claim 1, wherein the server computing device receives input from the first user indicating a bias balance in filtering the content of the first users' activity stream.

3. The system of claim 1, comprising a natural language processor to, when executed by the processor:
- determine the topic of the first post; and
- match the first post to the topic recorded in the database.

4. The system of claim 1, wherein the system scans for biases at an interval of time.

5. The system of claim 1, wherein the bias each user has demonstrated with respect to at least one topic is monitored over a period of time.

6. A method of managing content on a social network comprising:
- maintaining a database of users of a social network provided over a network interface between a server computing device and the social network, the database recording a bias each user has demonstrated with respect to at least one topic;
- monitoring reactions to a first post on the social network, wherein the monitored reactions to the first post comprise approval of the first post, commenting positively on the first post, commenting negatively on the first post, or ignoring the first post;
- determining a first bias factor for the first post based on the reactions to the first post and a corresponding recorded bias from the database of each user that reacts to the first post;
- filtering content of a first user's activity stream based on a bias factors of previous posts available for inclusion in the first user's activity stream;
- reporting to a system administrator an indication of the first post having the first bias factor exceeding a threshold; and
- providing to the first user's activity stream a pervious post from a second database with a second bias factor to balance the first bias factor of the first post.

7. The method of claim 6, wherein the threshold is adjustable.

8. The method of claim 6, wherein the bias each of the users has demonstrated with respect to the at least one topic is assigned a bias score, the bias score being adjusted based on whether the users' content has been from other biased users.

9. The method of claim 6, comprising receiving input from the first user indicating a bias balance in filtering the content of the first users' activity stream.

10. The method of claim 6, comprising, with a natural language processor:
- determining the topic of the first post; and
- matching the first post to the topic recorded in the database.

11. A computer program product for managing content on a social network, the computer program product comprising:
- a non-transitory computer readable storage medium comprising computer usable program code embodied therewith, the computer usable program code to, when executed by a processor:
  - monitor reactions to a first post on a social network provided over a network interface of a server computing device, wherein the monitored reactions to the first post comprise approval of the first post, commenting positively on the first post, commenting negatively on the first post, or ignoring the first post;
  - determine a first bias factor for the first post based on the reactions to the first post and a corresponding recorded bias from a database of each user that reacts to the first post, the database recording a bias a plurality of users have demonstrated with respect to at least one topic;
  - filter content of a first user's activity stream based on a bias factors of previous posts available for inclusion in the first user's activity stream;
  - report to a system administrator an indication of the first post having the first bias factor exceeding a threshold; and
  - provide to the first user's activity stream a pervious post from a second database with a second bias factor to balance the first bias factor of the first post.

12. The computer program product of claim 11, wherein the bias each of the users has demonstrated with respect to the at least one topic is assigned a bias score, the bias score being adjustable based on whether the users' content has been from other biased users.

13. The computer program product of claim 11, comprising a natural language processing engine to, when executed by a processor:
- determining the topic of the first post; and
- matching the first post to the topic recorded in the database.

* * * * *